Jan. 24, 1961
R. A. GILBERT
2,968,922
COMBUSTION TURBINE POWER UNITS
Filed Sept. 29, 1958
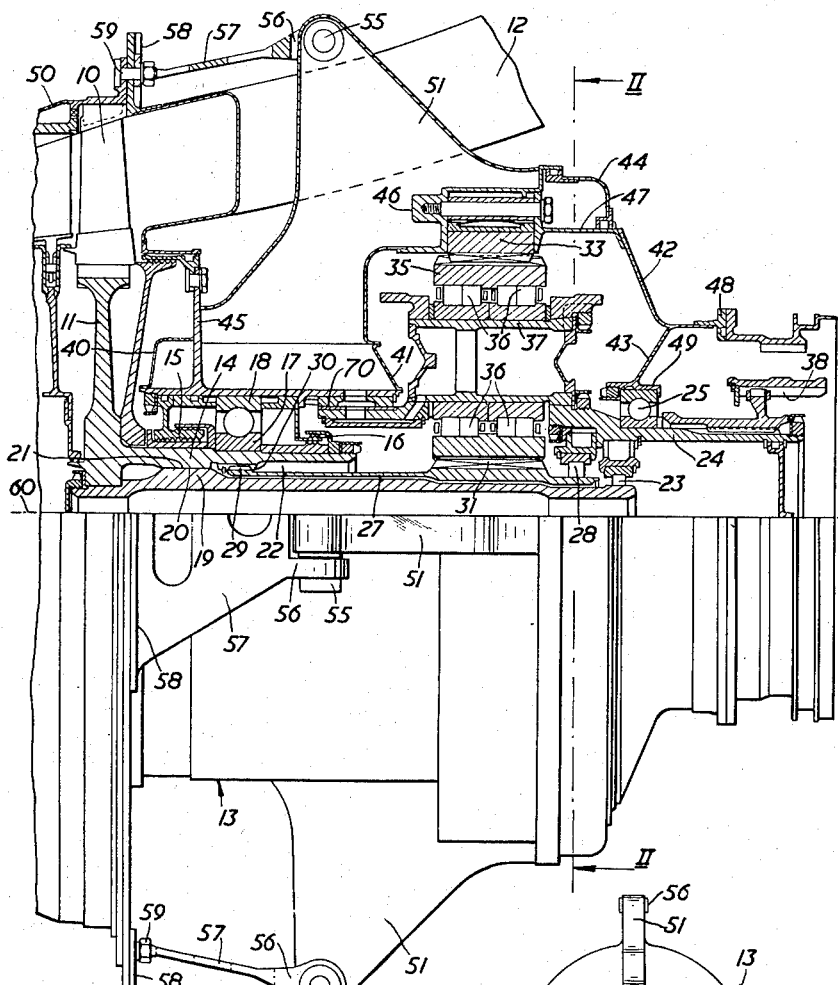
FIG. 1.
FIG. 2.
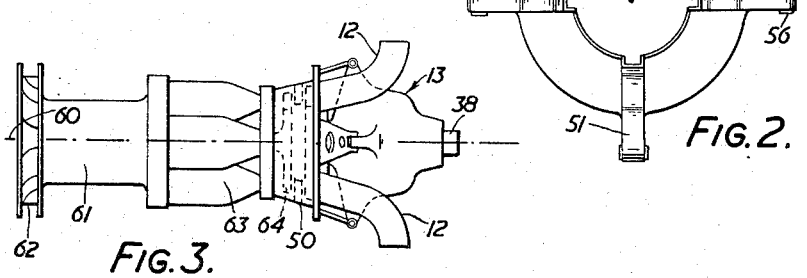
FIG. 3.
INVENTOR
RONALD A. GILBERT
BY
Watson, Cole, Grindle & Watson
ATTORNEY United States Patent Office 2,968,922
Patented Jan. 24, 1961

2,968,922
COMBUSTION TURBINE POWER UNITS

Ronald A. Gilbert, London, England, assignor to D. Napier & Son Limited, London, England, a British company Filed Sept. 29, 1958, Ser. No. 764,112

3 Claims. (Cl. 60—39.5)

This invention relates to combustion turbine power units of the kind in which a power turbine, which is mechanically independent of the turbine which drives the air compressor of the power unit, provides a mechanical drive, for instance for a propeller in the case of an aircraft or a rotary wing system in the case of a helicopter.

The power turbine in such a power unit normally rotates at a speed considerably higher than the desired rotational speed of the propeller or rotary wing system, and consequently it is necessary to provide reduction gearing in the drive from the power turbine. It is convenient to build in the reduction gearing as part of the power unit, and in the present applicant's United States application No. 576,101, now Patent Number 2,945,350, a power unit of this general type is disclosed.

It is an object of the present invention to provide a power unit of the type specified having improved provision for mounting the power turbine.

A further object is to provide such a power unit in which the power turbine is mounted in bearings supported in the reduction gear casing.

Yet another object is to provide such a power unit of simplified design permitting saving of weight by avoiding the need for a special bearing-supporting structure for the power turbine.

Other objects and advantages of the invention will become apparent from the following description and the accompanying drawings of a specific embodiment. This embodiment is described by way of example, and the description is therefore not to be construed in a limiting sense. In the accompanying drawings;

Figure 1 is a side elevation of the reduction gear casing and associated parts with part of the upper half shown in section;

Figure 2 is a simplified cross-section taken on the line II—II in Figure 1; and

Figure 3 is a simplified small scale side elevation of the power unit as a whole.

In a combustion turbine power unit according to the present invention the reduction gearing is arranged within a casing disposed on the side of the power turbine remote from the compressor and includes an input shaft coaxial with, and directly driven by, the power turbine, while the power output shaft projects from the side of the reduction gear casing remote from the power turbine, exhaust ducting is disposed on the side of the power turbine remote from the compressor and between the power turbine and the reduction gear casing for carrying away the exhaust gases from the turbines, a plurality of circumferentially-spaced stress-transmitting members connect the power unit reduction gear casing directly to the turbine casing independently of the exhaust ducting, and the power turbine is mechanically separate from, and is disposed downstream of, the compressor-driving turbine and is mounted in bearings supported in the reduction gear casing.

Preferably, the reduction gear casing is mounted on the turbine casing by four circumferentially-spaced stress-transmitting members as described in the aforementioned copending United States patent application Serial No. 576,101, now Pat. No. 2,945,350, these stress-transmitting members permitting irregular radial expansion of the turbine casing while maintaining exact alignment of the main axes of the respective casings. Thus, despite the fact that the power turbine and the compressor-driving turbine are supported by bearings mounted in different casings, their correct alignment is accurately maintained.

Referring now to the drawings, and in particular to Figure 3, the power unit comprises an axial flow compressor 61 having an air intake 62 at one end and delivering at its other end into a plurality of combustion chambers 63 in which fuel is burnt. The hot products of combustion pass into a turbine casing 50 containing a compressor-driving turbine 64 which drives said axial flow compressor 61 by means of a shaft (not shown) which is coaxial with the main axis 60 of the power unit. The output of the power turbine is transmitted through reduction gearing contained in a casing 13 to an output shaft 38. The exhaust gases are discharged to the atmosphere through exhaust ducting 12.

Referring now more particularly to Figures 1 and 2, the power turbine is indicated by the reference 11 and is provided with a blade ring 10. The power turbine 11 is mechanically independent of the compressor-driving turbine 64 and has a single stage rotor disc mounted in the overhung manner in bearings supported in the rigid reduction gear casing 13. Extending axially from the rear side of the rotor disc is an integral cylindrical sleeve 14 forming part of the rotor shaft. This sleeve passes through gas and oil seals 15, 16 and carries the inner race 17 of a main ball bearing, the outer race 18 of this bearing being fixed in the said casing 13. Secured to the center of the rotor disc is one end of a hollow shaft 19 which extends through the interior of the said cylindrical sleeve 14. This inner shaft forms the rest of the rotor shaft and has an external cylindrical surface 20 which is a snug fit within a corresponding internal cylindrical surface 21 in the sleeve 14 so that relative movement between the two parts of the rotor shaft is prevented. The said cylindrical surfaces 20 and 21 terminate short of the zone of the main bearing 17, 18 and there is an annular recess 22 between the sleeve 14 and the inner shaft 19 inwardly spaced from the inner race 17 of the main bearing and extending to the rear end of the sleeve 14.

The rear end of the inner shaft 19 is supported in an outrigger bearing 23 which is itself supported in a rotatable planet carrier 24 of epicyclic reduction gearing through which the turbine drive is transmitted. This planet carrier 24 is supported in a plain bearing 70 between the power turbine 11 and the sun gear of the epicyclic gearing, and in a ball bearing 25, both bearings 70 and 25 being themselves supported in the rigid casing 13. Hence the outrigger bearing 23 is supported indirectly by the casing 13.

Surrounding the inner shaft 19 with a slight radial clearance from it is a hollow shaft 27, the rear end of this hollow shaft being supported in a bearing 28 in the planet carrier 24, which bearing is mounted in such a manner that it has a limited degree of radial freedom in the planet carrier 24. The front end of the hollow shaft 27 enters the said recess 22 between the sleeve 14 and the inner shaft 19 and is provided with external splines 29 which engage corresponding internal splines 30 formed in the sleeve 14 in the zone of the main bearing 17, 18 whereby the drive is transmitted from the sleeve 14 to the hollow shaft 27. Gear teeth 31 are formed on the hollow shaft 27 and constitute the sun gear of the epicyclic gearing.

The ring gear 33 of the epicyclic gearing is mounted in the casing 13. The planet gears 35 which mesh with the sun gear 31 and the ring gear 33 are supported by bearings 36 on hollow shafts 37 fixed to the planet carrier 24. The output of the reduction gearing is taken from the planet carrier 24 by a splined connection 38.

The rigid reduction gear casing 13 is fabricated from sheet metal pressings such as 40, 41, 42, 43 and 44 which are rigidly secured to machined members such as 45, 46, 47, 48 and 49 by welded or bolted joints. Joints that will never have to be dismantled can be made by welds, but joints that require to be dismantled, for instance to facilitate assembly, such as the joint between the members 46 and 47, are made with bolts.

Since the power turbine 10, 11 is mounted in the main bearing 17 and 18 directly in the casing 13, and also indirectly in this casing by the bearings 23 and 25 acting through the planet carrier 24, means must be provided for locating the power turbine accurately in the turbine casing 50 and maintaining its correct alignment with the main axis. Such means comprises four arms 51 (see Figure 2) which are welded to the casing 13 to form integral parts thereof and which project radially outwards. At their outer ends these arms are provided with transverse pins 55 which enter yokes 56 in the ends of A-brackets 57. The feet 58 of these A-brackets are rigidly secured to the turbine casing 50 by bolts 59. The A-brackets are relatively thin so that although their feet are rigidly secured to the turbine casing the yokes are capable of limited movement in the radial direction towards and away from the axis 60. However, the brackets are sufficiently rigid in the circumferential direction to prevent any movement of the yokes in this direction. This form of mounting provides location for the reduction gear casing 13 in relation to the main axis 60, and while it maintains accurate alignment of the axis of the power turbine 10, 11 with the main axis 60 it nevertheless permits unequal radial expansion of the turbine casing 50. This is because if one sector of the turbine casing expands radially to a different extent from the other sectors, the A-bracket connected to the former sector will bend to a greater extent than the other A-brackets, but owing to the circumferential rigidity of the A-brackets these effectively restrain the casing 13 against lateral movement. The arms 51 and the A-brackets 57 together constitute stress-transmitting members which transmit axial and radial loads from the casing 13 to the turbine housing 50 while permitting irregular radial expansions of the turbine casing 50 yet maintaining exact alignment of the axis of the casing 13 and hence of the power turbine 10, 11 with the main axis 60. Thus despite the fact that the power turbine 10, 11 and the compressor turbine (not shown) are supported by bearings mounted in different casings, their correct relative positions are accurately maintained.

What I claim as my invention and desire to secure by Letters Patent is:

1. Means for supporting a free power turbine from a turbine casing surrounding said free power turbine, comprising a rigid gear casing, a power turbine shaft extending from said power turbine into said gear casing, an output shaft extending out of said gear casing in coaxial alignment with said power turbine shaft, epicyclic speed reduction gearing connecting said power turbine shaft to said output shaft within said gear casing and bearing means for said power turbine, said epicyclic gearing comprising a sun gear surrounding said power turbine shaft, a driving connection between said power turbine shaft and said sun gear, a non-rotatable ring gear, a planet gear carrier, first bearing means supporting said planet gear carrier rotatably in said gear casing between said power turbine and said sun gear, second bearing means supporting said planet gear carrier rotatably in said gear casing on the opposite side of said sun gear from said first bearing means and a driving connection between said planet gear carrier and said output shaft, and said bearing means for said power turbine locating said power turbine shaft coaxially with said gear casing and comprising a main bearing mounted in said gear casing and supporting said power turbine shaft between said power turbine and said sun gear, and an outrigger bearing supporting said power turbine shaft on the opposite side of said sun gear from said main bearing, said outrigger bearing being mounted in said planet gear carrier.

2. Means for supporting a free power turbine according to claim 1, which includes exhaust duct branches extending from said turbine casing on the same side thereof as said gear casing, and a plurality of stress-transmitting members connecting said gear casing to said turbine casing, passing between said exhaust duct branches, and locating said gear casing coaxially with said turbine casing.

3. Means for supporting a free power turbine according to claim 2 in which said stress-transmitting members are four in number and are disposed at right angles to each other, each said stress-transmitting member consisting of a rigid arm extending radially from said reduction gear casing, a bracket secured to said turbine casing, and an articulated connection between said rigid arm and said bracket, each of said brackets being constructed to be capable of limited deflection in the radial direction but rigid in the circumferential direction relatively to said turbine casing.

References Cited in the file of this patent

UNITED STATES PATENTS

| | | |
|---|---|---|
| 2,469,439 | Lundquist | May 10, 1949 |
| 2,488,783 | Stalker | Nov. 22, 1949 |
| 2,695,499 | Walker | Nov. 30, 1954 |
| 2,718,756 | McDowall | Sept. 27, 1955 |
| 2,831,543 | Matthews | Apr. 22, 1958 |
| 2,880,571 | Glamann | Apr. 7, 1959 |

FOREIGN PATENTS

| | | |
|---|---|---|
| 787,739 | Great Britain | Dec. 18, 1957 |